(12) United States Patent
Han et al.

(10) Patent No.: US 11,263,530 B2
(45) Date of Patent: Mar. 1, 2022

(54) APPARATUS FOR OPERATIONS AT MAXOUT LAYER OF NEURAL NETWORKS

(71) Applicant: Cambricon Technologies Corporation Limited, Beijing (CN)

(72) Inventors: Dong Han, Beijing (CN); Qi Guo, Beijing (CN); Tianshi Chen, Beijing (CN); Yunji Chen, Beijing (CN)

(73) Assignee: Cambricon Technologies Corporation Limited, Beijing (CN)

( * ) Notice: Subject to any disclaimer, the term of this patent is extended or adjusted under 35 U.S.C. 154(b) by 654 days.

(21) Appl. No.: 16/164,692

(22) Filed: Oct. 18, 2018

(65) Prior Publication Data

US 2019/0050736 A1 Feb. 14, 2019

Related U.S. Application Data

(63) Continuation-in-part of application No. PCT/CN2016/079637, filed on Apr. 19, 2016.

(51) Int. Cl.
*G06N 3/08* (2006.01)
*G06N 3/04* (2006.01)
*G06N 3/06* (2006.01)

(52) U.S. Cl.
CPC ............... *G06N 3/082* (2013.01); *G06N 3/04* (2013.01); *G06N 3/06* (2013.01)

(58) Field of Classification Search
CPC .............. G06N 3/082; G06N 3/04; G06N 3/06
USPC .......................................................... 706/25
See application file for complete search history.

(56) References Cited

U.S. PATENT DOCUMENTS

| 2003/0120363 | A1 | 6/2003 | Luo et al. |
| 2005/0183087 | A1* | 8/2005 | Kubota ................. G06F 9/5044 718/100 |
| 2015/0199963 | A1 | 7/2015 | Maaninen |
| 2016/0026912 | A1 | 1/2016 | Falcon et al. |

FOREIGN PATENT DOCUMENTS

WO    WO 2017/181336 A1    10/2017

OTHER PUBLICATIONS

Chang, et al., "Batch-normalized Maxout Network in Network", arXiv:1511.02583v1 [cs.CV] Nov. 9, 2015 (Year: 2015).*

(Continued)

*Primary Examiner* — Tsu-Chang Lee
(74) *Attorney, Agent, or Firm* — Getech Law LLC; Jun Ye

(57) ABSTRACT

Aspects for maxout layer operations in neural network are described herein. The aspects may include a load/store unit configured to retrieve input data from a storage module. The input data may be formatted as a three-dimensional vector that includes one or more feature values stored in a feature dimension of the three-dimensional vector. The aspects may further include a pruning unit configured to divide the one or more feature values into one or more feature groups based on one or more data ranges and select a maximum feature value from each of the one or more feature groups. Further still, the pruning unit may be configured to delete, in each of the one or more feature groups, feature values other than the maximum feature value and update the input data with the one or more maximum feature values.

16 Claims, 2 Drawing Sheets

(56) References Cited

OTHER PUBLICATIONS

Saghir et al., "Application-Specific Instruction-Set Architectures for Embedded DSP Applications", Ph.D Thesis, Department of Electrical and Computer Engineering, University of Toronto, Canada, 1998 (Year: 1998).*
Saeks, et al., "Design of a MIMD neural network processor", SPIE's international symposium on Optical Engineering and Photonics in Aerospace Sensing, 1994, Orlando (Year: 1994).*
T. Chen, et al., "A Small-Footprint Accelerator for Large-Scale Neural Networks", ACM Transactions on Computer Systems, vol. 33, No. 2, Article 6, May 2015, 27 pages.
Z. Du, et al., "An Accelerator for High Efficient Vision Processing", IEEE Transactions on Computer-aided Design of Integrated Circuits and System, vol. 36, No. 2, Feb. 2017, pp. 227-240.
S. Liu, et al., "Cambricon: An Instruction Set Architecture for Neural Networks", 2016 ACM/IEEE 43rd Annual International Symposium on Computer Architecture, Oct. 12, 2016, pp. 393-405.
S. Zhang, et al., "Cambricon-X" An Accelerator for Sparse Neural Networks, The 49th Annual IEEE/ACM International Symposium on Microarchitecture Article No. 20, Oct. 15, 2016, 12 pages.
Y. Chen, et al., "DaDianNao: A Machine-Learning Supercomputer", 2014 47th Annual IEEE/ACM International Symposium on Microarchitecture, Dec. 13, 2014, pp. 609-622.
T. Luo, et al., "DaDianNao: A Neural Network Supercomputer", IEEE Transaction on Computers, vol. 66, No. 1, Jan. 2017, pp. 73-88.
T. Chen, et al., "DianNao: A Small-Footprint High-Throughput Accelerator for Ubiquitous Machine-Learning", ASPLOS 14, Proceedings of the 19th international conference on Architectural support for programming languages and operating systems, Feb. 24, 2014, pp. 269-283.
Y. Chen, et al., "DianNao Family: Energy-Efficient Hardware Accelerators for Machine Learning", Communications of the ACM, vol. 59, No. 11, Nov. 2016, pp. 105-112.
D. Liu, et al., "PuDianNao: A Polyvalent Machine Learning Accelerator", ASPLOS '15 Proceedings of the Twentieth International Conference on Architectural Support for Programming Languages and Operating Systems, Mar. 14, 2015, pp. 369-381.
Z. Du, et al., "ShiDianNao: Shifting Vision Processing Closer to the Sensor", ISCA '15 Proceedings of the 42nd Annual International Symposium on Computer Architecture, Jun. 13, 2015, pp. 92-104.
EP 16898926.7—European Search and Opinion, dated Dec. 3, 2019, 8 pages.
EP 16898926.7—Written Opinion, dated Dec. 3, 2019, 8 pages.
EP 16898926.7—Extended European Search Report, dated Nov. 28, 2019, 13 pages.
Goodfellow, et al, "Maxout Networks", Proceedings of the 30th International Conference on Machine Learning, 2013, 9 pages.
CN 201610244656.7—First Office Action, dated Jul. 1, 2020, 6 pages. (no English translation).
PCT/CN2016/079637—International Search Report, dated Jan. 26, 2017, 13 pages. (no English translation).

* cited by examiner

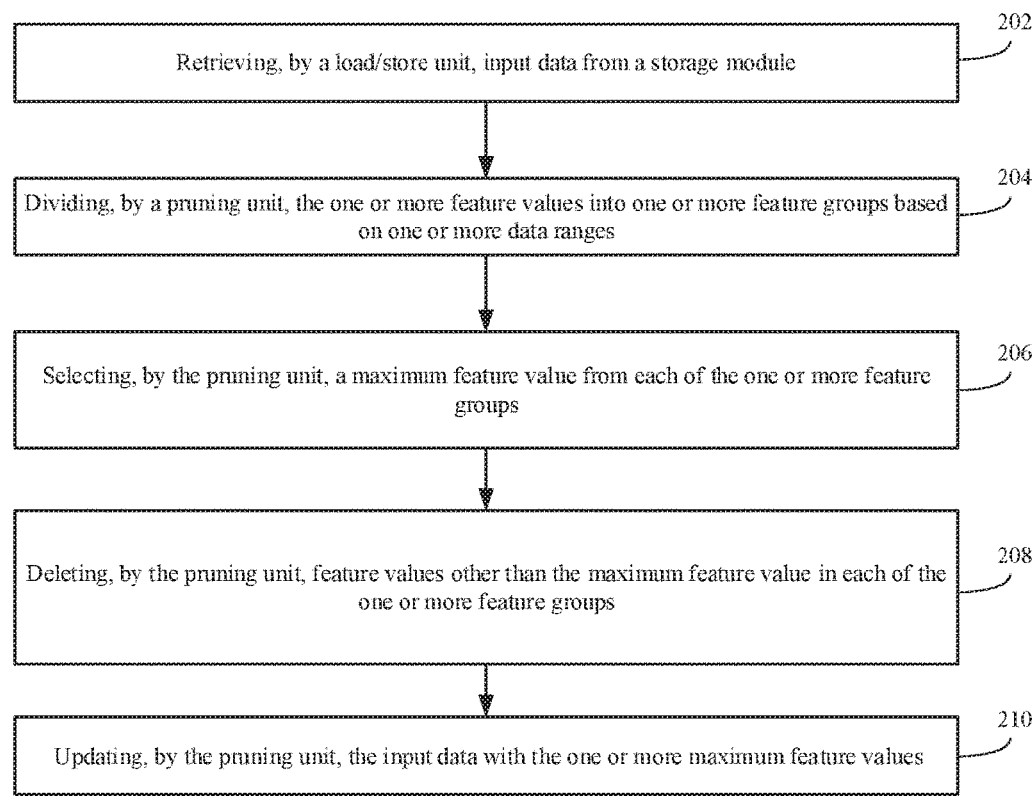

APPARATUS FOR OPERATIONS AT MAXOUT LAYER OF NEURAL NETWORKS

CROSS-REFERENCE TO RELATED APPLICATIONS

The present invention is a continuation-in-part of PCT Application No. PCT/CN2016/079637, filed on Apr. 19, 2016, and incorporates by reference to CN application number 201610244656.7, filed on Apr. 19, 2016. The entire content of each of the aforementioned applications is incorporated herein by reference.

BACKGROUND

Many neural network algorithms contain a large number of maxout layer operations. In a neural network, input data may be pruned to reduce the consumption on computing power. For input data of maxout layer, the data is a three-dimensional data, which are the data of an abscissa, an ordinate, and a feature dimension.

A known method to perform the maxout layer operations of a multilayer artificial neural network is to use a general-purpose processor. Such a method uses a general-purpose register file and a general-purpose functional unit to execute general-purpose instructions to support algorithms in MNNs. However, one of the defects of the method is low operational performance of a single general-purpose processor which cannot meet performance requirements for usual multilayer neural network operations. When multiple general-purpose processors execute concurrently, the intercommunication among them also becomes a performance bottleneck.

Another known method to perform the maxout layer operations of the multilayer artificial neural network is to use a graphics processing unit (GPU). Such a method uses a general-purpose register file and a general-purpose stream processing unit to execute general purpose single-instruction-multiple-data (SIMD) instructions to perform the maxout layer operations in MNNs. However, since GPU only contains rather small on-chip caching, then model data (weight values) of a multilayer artificial neural network may be repeatedly moved from the off-chip, and off-chip bandwidth becomes a main performance bottleneck, causing huge power consumption.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

One example aspect of the present disclosure provides an example apparatus for data pruning at a maxout layer of a neural network. The example apparatus may include a load/store unit configured to retrieve input data from a storage module. The input data may be formatted as a three-dimensional vector that includes one or more feature values stored in a feature dimension of the three-dimensional vector. The example apparatus may further include a pruning unit configured to divide the one or more feature values into one or more feature groups based on one or more data ranges, select a maximum feature value from each of the one or more feature groups, delete, in each of the one or more feature groups, feature values other than the maximum feature value, and update the input data with the one or more maximum feature values.

Another example aspect of the present disclosure provides an example method for data pruning at a maxout layer of a neural network. The example method may include retrieving, by a load/store unit, input data from a storage module, wherein the input data is formatted as a three-dimensional vector that includes one or more feature values stored in a feature dimension of the three-dimensional vector; dividing, by a pruning unit, the one or more feature values into one or more feature groups based on one or more data ranges; selecting, by the pruning unit, a maximum feature value from each of the one or more feature groups; deleting, by the pruning unit, feature values other than the maximum feature value in each of the one or more feature groups; and updating, by the pruning unit, the input data with the one or more maximum feature values.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which:

FIG. 2 is a flow chart of an example method for pruning input data at maxout layers of a neural network.

DETAILED DESCRIPTION

Figure 1:
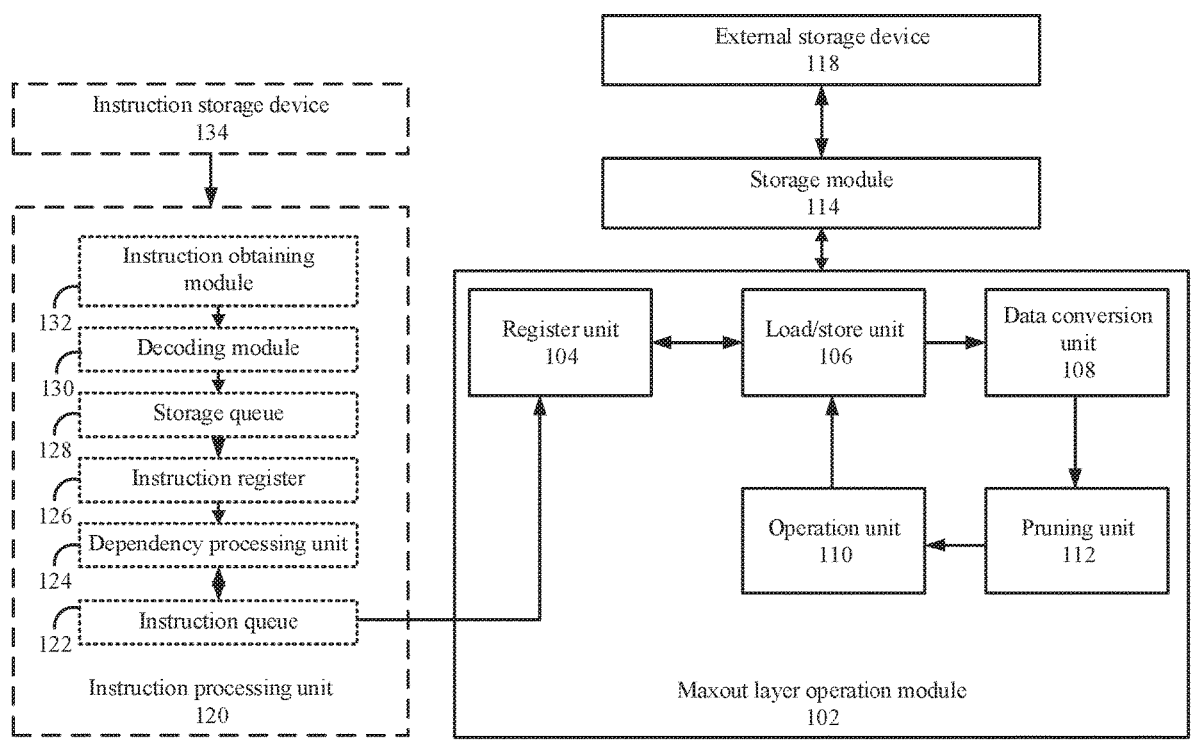
FIG. 1 illustrates a block diagram of an example maxout layer operation module by which maxout layer operations may be performed.

Various aspects are now described with reference to the drawings. In the following description, for purpose of explanation, numerous specific details are set forth in order to provide a thorough understanding of one or more aspects. It may be evident, however, that such aspect(s) may be practiced without these specific details.

In the present disclosure, the term "comprising" and "including" as well as their derivatives mean to contain rather than limit; the term "or", which is also inclusive, means and/or.

In this specification, the following various embodiments used to illustrate principles of the present disclosure are only for illustrative purpose, and thus should not be understood as limiting the scope of the present disclosure by any means. The following description taken in conjunction with the accompanying drawings is to facilitate a thorough understanding to the illustrative embodiments of the present disclosure defined by the claims and its equivalent. There are specific details in the following description to facilitate understanding. However, these details are only for illustrative purpose. Therefore, persons skilled in the art should understand that various alternation and modification may be made to the embodiments illustrated in this description without going beyond the scope and spirit of the present disclosure. In addition, for clear and concise purpose, some known functionality and structure are not described. Besides, identical reference numbers refer to identical function and operation throughout the accompanying drawings.

A neural network may include one or more maxout layers. The maxout layers may refer to groups of operations that prune input data to generate a relatively smaller data set for further processing. Typically, the input data at a maxout layer may be formatted as three-dimensional vectors that include an abscissa, an ordinate, and a feature dimension. Taking a color image as an example, each pixel of the image may be represented by a three-dimensional vector. The abscissa and the ordinate may describe a position of the pixel in the image and the feature dimension may refer to the color information of the pixel. In some other examples, the input data may be one or more feature maps that include feature values stored in the feature dimension. The input data may be processed at the maxout layer and some portions of the input data may be deleted such that further processing may consume less computational power.

FIG. 1 illustrates a block diagram of an example maxout layer operation module 102 by which maxout layer operations may be performed. As depicted, the example maxout layer operation module 102 may include a register unit 104, a load/store unit 106, a data conversion unit 108, an operation unit 110, and a pruning unit 112.

The register unit 104 may be configured to store input data addresses of the input data of the maxout layer. The input data addresses may refer to the storage address of the input data in an external storage device, e.g., a storage module 114. In some examples, the register unit 104 may include a scalar register file configured to store scalar values that may be utilized during the maxout operations in addition to storing the input data addresses of the input data. In some examples where the input data may be repeatedly utilized, the register unit 104 may be further configured to store the input data in addition to the input data addresses such that the maxout layer operation module 102 is not required to retrieve data from the storage module 114.

The register unit 104 may be further configured to receive maxout layer operation instructions from an instruction queue 122. A maxout layer operation instruction may include an operation code and at least five operation fields. The operation code may indicate the operation to be performed. The five operation fields may respectively describe a starting address of the input data, a bit length of the input data, a starting address of output data, a bit length of the output data, and data ranges for pruning the input data.

In some examples, an above-mentioned instruction may originate from an instruction storage device 134. An instruction obtaining module 132 may be configured to obtain an instruction from the instruction storage device 134 and transmit the instruction to a decoding module 130. The decoding module 130 may be configured to decode the instruction and transmit the decoded instruction to a storage queue 128.

The storage queue 128 may be configured to temporarily store the received instruction and retrieve relevant values from the instruction or from an instruction register 126. For example, the instruction register 126 may be configured to provide information corresponding to operation fields in the instructions. The information may further include a count of feature layers of the input data, a size of single feature layer of the input data, a size of feature layer for maxout layer operation, etc. The instruction register 126 may be configured to store scalar values for the instruction. Once the relevant values are retrieved, the instruction may be sent to a dependency processing unit 124.

The dependency processing unit 124 may be configured to determine whether the instruction has a dependency relationship with the data of the previous instruction that is being executed. This instruction needs to wait in the instruction queue until it has no dependency relationship on the data with the previous instruction that has not finished executing. If the dependency relationship does not exist, the maxout layer operation instruction may be sent to the maxout layer operation module 102.

According to the maxout layer operation instruction or immediate values included in the instruction, a load/store unit 106 may be configured to retrieve the input data from the register unit 104.

A data conversion unit 108, a pruning unit 112, and an operation unit 110 may be configured to sequentially perform operations to the input data. In some examples, the data conversion unit 108, the pruning unit 112, and the operation unit 110 may be configured to connected or interfaced in a three-stage pipeline structure. For example, the data conversion unit 108 may be configured to perform operations at the first stage of the pipeline structure; the pruning unit 112 may be configured to perform operations at the second stage of the pipeline structure; and the operation unit 110 may be configured to perform operations at the third stage of the pipeline. Since the data conversion unit 108, the pruning unit 112, and the operation unit 110 may include internal caching units, data output from the data conversion unit 108 may be transmitted directly to the pruning unit 112 without being stored in the register unit 104. Similarly, data output from the pruning unit 112 may be transmitted directly to the operation unit 110 such that overall system latency may be reduced.

In more detail, the data conversion unit 108 may be configured to adjust a sequence for reading/writing the input data in the three respective dimensions. For example, the data conversion unit 108 may be configured to prioritize the reading/writing of the feature values by adjusting the read/write sequence. That is, feature values in the feature dimension of the input data may be read from or written into the register unit 104 or other storage components prior to the reading or writing of data in other dimensions of the input data.

With respect to the input data stored in accordance with the adjusted sequence, the pruning unit 112 may be configured to divide the feature values into one or more feature groups based on one or more data ranges. For example, the feature values of the input data may be presented as f and may be divided into one or more groups, e.g., $f_j|a_j \le i \le b_j$, according to the predetermined data ranges. For instance, when the input data includes feature values ($f_1$, $f_2$, $f_3$, $f_4$, $f_5$, $f_6$, $f_7$, $f_8$, $f_9$) and the data ranges may be predetermined to be $1 \le i \le 3$, $4 \le i \le 6$, and $7 \le i \le 9$. The pruning unit 112 may be configured to divide the feature values into three groups, e.g., {$f_1$, $f_2$, $f_3$}, {$f_4$, $f_5$, $f_6$}, and {$f_7$, $f_8$, $f_9$}.

Further, the pruning unit 112 may be configured to select a maximum feature value from each of the feature groups. For example, if $f_2$ is greater than $f_1$ and $f_3$, $f_5$ is greater than $f_4$ and $f_6$, $f_9$ is greater than $f_7$ and $f_8$, then the pruning unit 112 may be configured to select $f_2$, $f_5$, and $f_9$ as the maximum features values and delete other feature values in each feature groups. According, the feature values in the input data that include 9 values may now be pruned to include only three values. In other words, the pruning unit 112 may be further configured to update the input data such that the input data only includes the maximum feature values in each feature group.

The updated input data may then be transmitted to the operation unit 110. The operation unit 110 may be configured to perform one or more operations to the updated input data. IN some example, the operations may refer to one or more non-linear operations such as a sigmoid operation, a Tan H operation, a relu operation, or a softmax operation. The results of the operations may be transmitted by the operation unit 110 to the load/store unit 106. The load/store unit 106 may be further configured to store the results of the operations back to the storage module 114. The results of the operations may be further transmitted to an external storage device 118.

FIG. 2 is a flow chart of an example method 200 for pruning input data at maxout layers of a neural network. The example method 200 may be performed by one or more components of the apparatus of FIG. 1.

At block 202, the example method 200 may include retrieving, by a load/store unit, input data from a storage module. For example, a load/store unit 106 may be configured to retrieve the input data from the register unit 104. The input data may be formatted as a three-dimensional vector that includes one or more feature values stored in a feature dimension of the three-dimensional vector. For example, the input data may refer to one or more feature maps include an abscissa, an ordinate, and a feature dimension. One or more feature values may be stored in the feature dimension.

At block 204, the example method 200 may include dividing, by a pruning unit, the one or more feature values into one or more feature groups based on one or more data ranges. For example, the pruning unit 112 may be configured to divide the feature values into one or more feature groups based on one or more data ranges. For example, the feature values of the input data may be presented as f and may be divided into one or more groups, e.g., $f_j|a_j \le i \le b_j$, according to the predetermined data ranges. For instance, when the input data includes feature values ($f_1$, $f_2$, $f_3$, $f_4$, $f_5$, $f_6$, $f_7$, $f_8$, $f_9$) and the data ranges may be predetermined to be $1 \le i \le 3$, $4 \le i \le 6$, and $7 \le i \le 9$. The pruning unit 112 may be configured to divide the feature values into three groups, e.g., {$f_1$, $f_2$, $f_3$}, {$f_4$, $f_5$, $f_6$}, and {$f_7$, $f_8$, $f_9$}.

At block 206, the example method 200 may include selecting, by the pruning unit, a maximum feature value from each of the one or more feature groups. For example, For example, if $f_2$ is greater than $f_1$ and $f_3$, $f_5$ is greater than $f_4$ and $f_6$, $f_9$ is greater than $f_7$ and $f_8$, then the pruning unit 112 may be configured to select $f_2$, $f_5$, and $f_9$ as the maximum features values.

At block 208, the example method 200 may include deleting, by the pruning unit, feature values other than the maximum feature value in each of the one or more feature groups. For example, the pruning unit 112 may be configured to delete other feature values in each feature groups.

At block 210, the example method 200 may include updating, by the pruning unit, the input data with the one or more maximum feature values. For example, the pruning unit 112 may be further configured to update the input data such that the input data only includes the maximum feature values in each feature group.

The process or method described in the above accompanying figures can be performed by process logic including hardware (for example, circuit, specific logic etc.), firmware, software (for example, a software being externalized in non-transitory computer-readable medium), or the combination of the above two. Although the process or method is described above in a certain order, it should be understood that some operations described may also be performed in different orders. In addition, some operations may be executed concurrently rather than in order.

In the above description, each embodiment of the present disclosure is illustrated with reference to certain illustrative embodiments. Apparently, various modifications may be made to each embodiment without going beyond the wider spirit and scope of the present disclosure presented by the affiliated claims. Correspondingly, the description and accompanying figures should be understood as illustration only rather than limitation. It is understood that the specific order or hierarchy of steps in the processes disclosed is an illustration of exemplary approaches. Based upon design preferences, it is understood that the specific order or hierarchy of steps in the processes may be rearranged. Further, some steps may be combined or omitted. The accompanying method claims present elements of the various steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described herein that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

We claim:

1. An apparatus for data pruning at a maxout layer of a neural network, comprising:
    an operation circuit configured to receive a maxout layer operation instruction that includes an operation code and at least five operation fields, wherein the at least five operation fields respectively indicate a starting address of the input data, a bit length of the input data, a starting address of output data, a bit length of the output data, and the one or more data ranges that determine the one or more feature groups;
    a load/store circuit configured to retrieve input data from a storage module in response to the maxout layer operation instruction,
    wherein the input data is formatted as a three-dimensional vector that includes one or more feature values stored in a feature dimension of the three-dimensional vector; and
    a pruning circuit configured to
        in response to the maxout layer operation instruction, divide the one or more feature values into one or more feature groups based on one or more data ranges,
        in response to the maxout layer operation instruction, select a maximum feature value from each of the one or more feature groups, in response to the maxout layer operation instruction, delete, in each of the one or more feature groups, feature values other than the maximum feature value, and in response to the maxout layer operation instruction, update the input data with the one or more maximum feature values.

2. The apparatus of claim 1, wherein the input data further includes an abscissa and an ordinate.

3. The apparatus of claim 1, further comprising a data conversion circuit configured to adjust a write sequence in storing the input data.

4. The apparatus of claim 3, wherein the load/store circuit is further configured to store the one or more feature values prior to storing data in other dimensions of the input data in accordance with the adjusted write sequence.

5. The apparatus of claim 3, wherein the data conversion circuit is further configured to adjust a read sequence in loading the input data.

6. The apparatus of claim 5, wherein the load/store circuit is further configured to load the one or more feature values prior to loading the data in other dimensions of the input data in accordance with the adjusted read sequence.

7. The apparatus of claim 1, further comprising the operation circuit configured to perform one or more operations to the updated input data, wherein the one or more operations include a sigmoid operation, a TanH operation, a relu operation, or a softmax operation.

8. The apparatus of claim 1, further comprising a register circuit configured to store data addresses that indicate where the input data is stored in the storage module.

9. A method for data pruning at a maxout layer of a neural network, comprising:

receiving, by an operation circuit, a maxout layer operation instruction that includes an operation code and at least five operation fields, wherein the at least five operation fields respectively indicate a starting address of the input data, a bit length of the input data, a starting address of output data, a bit length of the output data, and the one or more data ranges that determine the one or more feature groups;

retrieving, in response to the maxout layer operation instruction, by a load/store circuit, input data from a storage module, wherein the input data is formatted as a three-dimensional vector that includes one or more feature values stored in a feature dimension of the three-dimensional vector;

dividing, in response to the maxout layer operation instruction, by a pruning circuit, the one or more feature values into one or more feature groups based on one or more data ranges;

selecting, in response to the maxout layer operation instruction, by the pruning circuit, a maximum feature value from each of the one or more feature groups;

deleting, in response to the maxout layer operation instruction, by the pruning circuit, feature values other than the maximum feature value in each of the one or more feature groups; and updating, in response to the maxout layer operation instruction, by the pruning circuit, the input data with the one or more maximum feature values.

10. The method of claim 9, wherein the input data further includes an abscissa and an ordinate.

11. The method of claim 9, further comprising adjusting, by a data conversion circuit, a write sequence in storing the input data.

12. The method of claim 11, further comprising storing, by the load/store circuit, the one or more feature values prior to storing data in other dimensions of the input data in accordance with the adjusted write sequence.

13. The method of claim 11, further comprising adjusting, by the data conversion circuit, a read sequence in loading the input data.

14. The method of claim 13, further comprising loading, by the load/store circuit, the one or more feature values prior to loading the data in other dimensions of the input data in accordance with the adjusted read sequence.

15. The method of claim 9, further comprising performing, by the operation circuit, one or more operations to the updated input data, wherein the one or more operations include a sigmoid operation, a TanH operation, a relu operation, or a softmax operation.

16. The method of claim 9, further comprising storing, by a register circuit, data addresses that indicate where the input data is stored in the storage module.

* * * * *